United States Patent
Brand et al.

(10) Patent No.: US 12,511,011 B2
(45) Date of Patent: Dec. 30, 2025

(54) VIRTUALLY EXPANDED SINGLE MONITOR CONTROLLED VIA MOTION DETECTION

(71) Applicant: International Business Machines Corporation, Armonk, NY (US)

(72) Inventors: Aleksandra Brand, Wallkill, NY (US); Susan Shumway, Poughkeepsie, NY (US); James A. O'Connor, Ulster Park, NY (US); Naomi Htoo-Mosher, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 18/499,047

(22) Filed: Oct. 31, 2023

(65) Prior Publication Data

US 2025/0138696 A1    May 1, 2025

(51) Int. Cl.
| | |
|---|---|
| *G06F 3/04815* | (2022.01) |
| *G06F 3/01* | (2006.01) |
| *G06F 3/0485* | (2022.01) |
| *G06T 7/20* | (2017.01) |
| *G06T 7/70* | (2017.01) |

(Continued)

(52) U.S. Cl.
CPC .......... *G06F 3/04815* (2013.01); *G06F 3/012* (2013.01); *G06F 3/013* (2013.01); *G06F 3/0485* (2013.01); *G06T 7/20* (2013.01); *G06T 7/70* (2017.01); *G06T 17/00* (2013.01); *G06V 40/28* (2022.01)

(58) Field of Classification Search
CPC ...... G06F 3/04815; G06F 3/012; G06F 3/013; G06F 3/0485; G06T 7/20; G06T 7/70; G06T 17/00; G06V 40/28
See application file for complete search history.

(56) References Cited

U.S. PATENT DOCUMENTS

| | | |
|---|---|---|
| 5,742,264 A | 4/1998 | Inagaki et al. |
| 5,841,435 A | 11/1998 | Dauerer et al. |
| 7,248,294 B2 | 7/2007 | Slatter |

(Continued)

FOREIGN PATENT DOCUMENTS

EP    1630719 B1    10/2007

OTHER PUBLICATIONS

Pop, S., "Fujitsu's Hands-Free Computing System Responds to Eye Movement: The technology relies on a motion sensor and infrared LED", published electronically Oct. 2, 2012, retrieved from the Internet on Jun. 13, 2023: https://news.softpedia.com/news/Fujitsu-s-Hands-Free-Computing-System-Responds-to-Eye-Movement-296213.shtml, SoftPedia, Romania.

(Continued)

*Primary Examiner* — Jitesh Patel
(74) *Attorney, Agent, or Firm* — Tihon Poltavets (57) ABSTRACT

In several aspects for panning across a virtual screen field for computing systems, at least one facial position deviation of a user is detected relative to a predetermined point of reference with respect to a display device. The at least one facial position deviation includes head movement of the user. The method further includes panning to a section of a virtual screen field based on a direction and a speed of the detected at least one facial position deviation of the user. Additionally, the method includes displaying the panned to section of the virtual screen on the display device.

12 Claims, 11 Drawing Sheets

(51) Int. Cl.
*G06T 17/00* (2006.01)
*G06V 40/20* (2022.01)

(56) References Cited

U.S. PATENT DOCUMENTS

| | | | |
|---|---|---|---|
| 7,515,773 | B2 | 4/2009 | Adachi et al. |
| 9,325,939 | B2 | 4/2016 | Schultz et al. |
| 9,965,026 | B2 | 5/2018 | Wang et al. |
| 10,497,175 | B2 | 12/2019 | Mount et al. |
| 2002/0158815 | A1 | 10/2002 | Zwern et al. |
| 2003/0025812 | A1 | 2/2003 | Slatter |
| 2006/0045382 | A1 | 3/2006 | Adachi et al. |
| 2014/0191948 | A1* | 7/2014 | Kim .................... H04M 1/0264 345/156 |
| 2016/0259403 | A1 | 9/2016 | Wang et al. |
| 2016/0317930 | A1* | 11/2016 | Nakayama .............. G09F 19/14 |
| 2018/0307397 | A1* | 10/2018 | Hastings ............... G06F 3/0484 |
| 2021/0019982 | A1* | 1/2021 | Todd .................. H04N 21/2343 |
| 2022/0019281 | A1* | 1/2022 | Olson ..................... G16H 40/67 |

OTHER PUBLICATIONS

Hawkeye Labs, Inc., "Hawkeye access for Mac: Control your Mac using head movements. Rotate your head to move the cursor and make facial expressions to click, drag, and scroll. (No screen panning.) Powered by your iPhone's TrueDepth camera", published Feb. 20, 2020, retrieved from the Internet on Jun. 13, 2023: https://apps.apple.com/us/app/hawkeye-access/id1492668476?mt=12, Apple, Inc., United States.

Hawkeye Labs, Inc., "Hawkeye Access for Mac: Control your Mac using head movements", published electronically Feb. 7, 2020, retrieved from the Internet on Jun. 13, 2023: https://apps.apple.com/us/app/hawkeye-access/id1492668476?mt=12, Apple, Inc., United States.

Intel Corporation, "Real Sense, New Product: D435if depth camera", initially released by Intel on Jan. 2018, retrieved from the Internet on Jun. 13, 2023: hhttps://www.intelrealsense.com/depth-camera-d435if/, United States.

actualtools.com, "Desktop Divider", Jul. 9, 2019, retrieved from the Internet on Jun. 13, 2023, https://www.intelrealsense.com/depth-camera-d435if/, Canada.

Sliden'joy, "Double or Triple Your Screens", published electronically Jul. 7, 2015, retrieved from the Internet on Jun. 13, 2023: https://www.kickstarter.com/projects/slidenjoy/slidenjoy-double-or-triple-your-screens, Kickstarter, Belgium.

Šumak, B., et al. "An Empirical Evaluation of a Hands-free Computer Interaction for Users with Motor Disabilities", Journal of Biomedical Informatics, Aug. 2019, 103249, Elsevier, doi: 10.1016/j.jbi.2019.103249, published electronically Aug. 19, 2019, pp. 1-16, vol. 96, United States.

Truly, A., "Apple Vision Pro: release date, price, specs, and more", digitaltrends.com, published electronically Jun. 5, 2023, retrieved from the Internet on Jun. 13, 2023: https://www.digitaltrends.com/computing/apple-vision-pro-headset-everything-we-know/.

ishadow.com, "Virtual Monitor" most recent build: May 9, 2023, retrieved from the Internet on Jul. 13, 2023: https://www.ishadow.com/vdm/?doing_wp_cron=1602858334.3586189746856689453125, Teknica Software, Inc.

\* cited by examiner

Detecting, By a Processor, at Least One Facial Position Deviation of a User Relative To a Predetermined Point of Reference With Respect To A Display Device
71

Panning To a Section of a Virtual Screen Field Based On a Direction and a Speed of the Detected at Least One Facial Position Deviation of the User

72

Displaying The Panned To Section Of The Virtual Screen On The Display Device

VIRTUALLY EXPANDED SINGLE MONITOR CONTROLLED VIA MOTION DETECTION

BACKGROUND

The field of embodiments of the present invention relates to processing for tracking the head movements of a computer user and, based on those movements, automatically adjusting the portion of a large virtual field image displayed on a screen.

It is widely accepted that productivity and focus is improved when a "desktop area" is as large as possible. This is especially true when work requires many different user interfaces to be accessed at once. Screen real estate is valuable. Some examples of tasks and workflows where this is essential: writing code and looking at the spec, using a debugger and execution windows without moving them around; monitoring multiple charts of stocks, options, indexes and news for trading purposes; editing videos or photographs; working with expansive spreadsheets, etc.

SUMMARY

Embodiments relate to processing for tracking the head movements of a computer user and, based on those movements, automatically adjusting the portion of a large virtual field image displayed on a screen. One embodiment provides a method for panning across a virtual screen field including detecting, by a processor, at least one facial position deviation of a user relative to a predetermined point of reference with respect to a display device. The at least one facial position deviation includes head movement of the user. The method further includes panning to a section of a virtual screen field based on a direction and a speed of the detected at least one facial position deviation of the user. Additionally, the method includes displaying the panned to section of the virtual screen on the display device.

These and other features, aspects and advantages of the present embodiments will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to processing for tracking the head movements of a computer user and, based on those movements, automatically adjusting the portion of a large virtual field image displayed on a screen. One embodiment provides a method for panning across a virtual screen field including detecting, by a processor, at least one facial position deviation of a user relative to a predetermined point of reference with respect to a display device. The at least one facial position deviation includes head movement of the user. The method further includes panning to a section of a virtual screen field based on a direction and a speed of the detected at least one facial position deviation of the user. Additionally, the method includes displaying the panned to section of the virtual screen on the display device.

Figure 1:
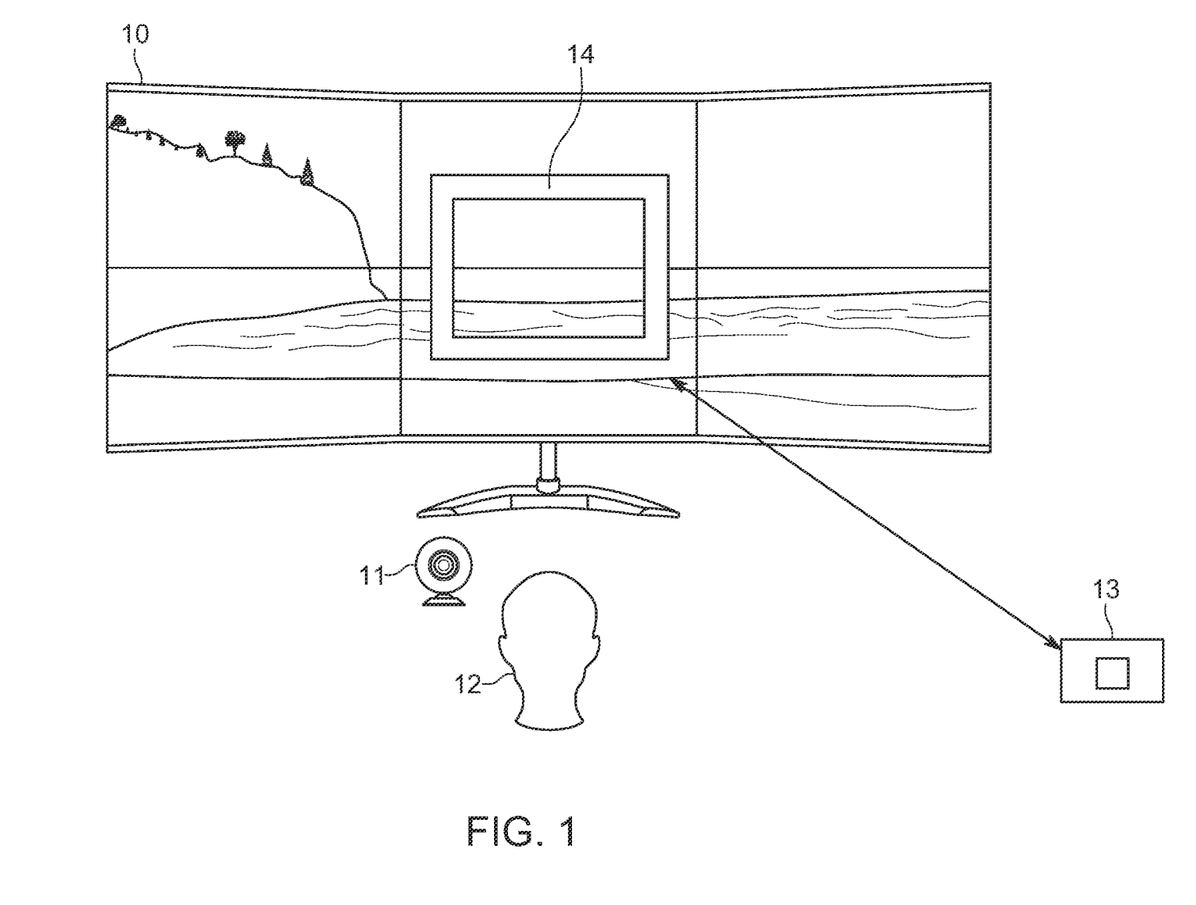
FIG. 1 shows a representation of a portion of a larger picture that is shown on the screen where a webcam tracks head movements, according to some embodiments.

FIG. 1 shows a representation of a portion 14 of a larger picture that is shown on a screen (e.g., a laptop screen, other portable computing electronic devices having a screen, a monitor, other non-portable display screens, etc.) where a webcam 11 (e.g., of desktop computing device, a laptop computing device, a portable computing device (e.g., a tablet computing device, etc.), etc.) tracks head 12 movements, according to some embodiments. In one or more embodiments, the rectangle 14 on the screen represents the portion of the larger picture that is shown on the screen. A large panoramic virtual field image 10 is provided initially. The webcam (or video camera) 11 tracks head 12 movements in various directions (left, right, up, down, forward, back, etc.). In some embodiments, the optional indicator 13 may be shown in the corner of the screen.

Figure 2:
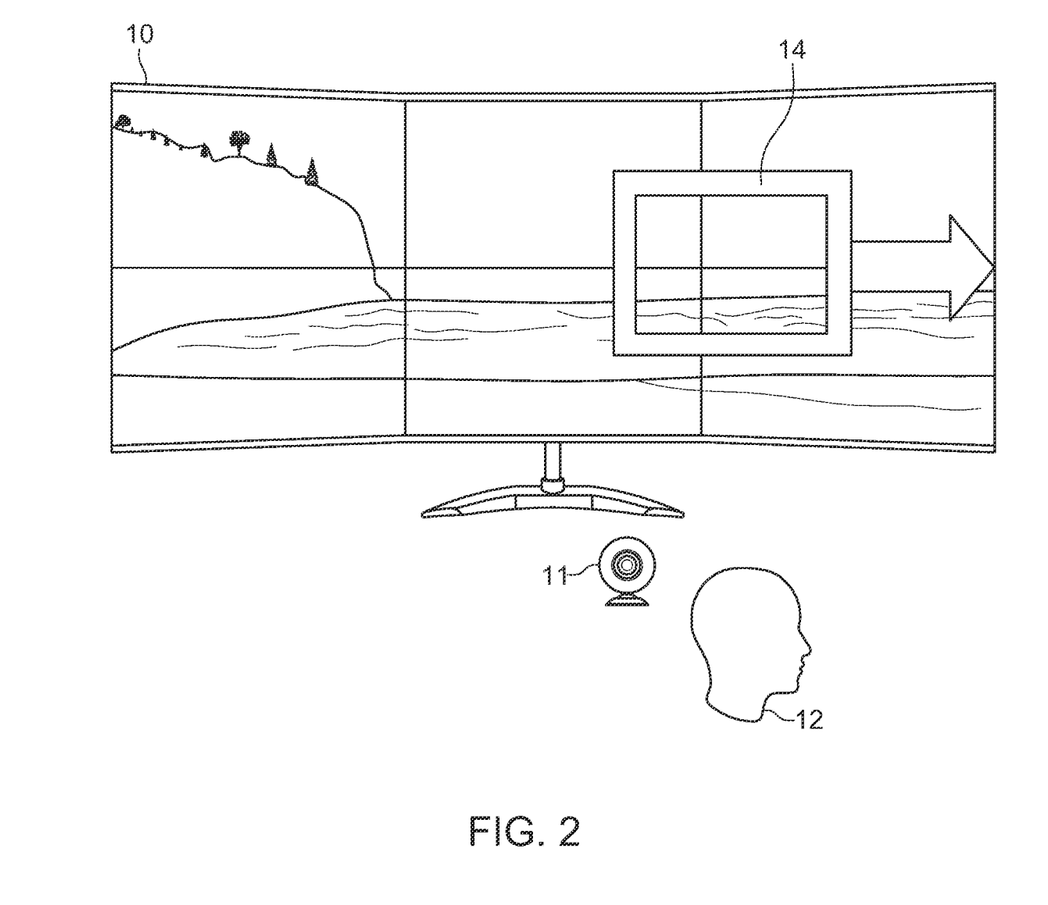
FIG. 2 shows a user's head turned to the right with the screen panning to the right, according to some embodiments.

FIG. 2 shows a user's head 12 turned to the right with the screen panning to the right, according to some embodiments. As shown, the portion 14 of the larger picture that is shown on a screen results in panning the screen to the right as indicated by the arrow pointing to the right. If the user turns their head 12 to the right, what is shown on the screen then pans to the right based on the webcam 11 and processing.

Figure 3:
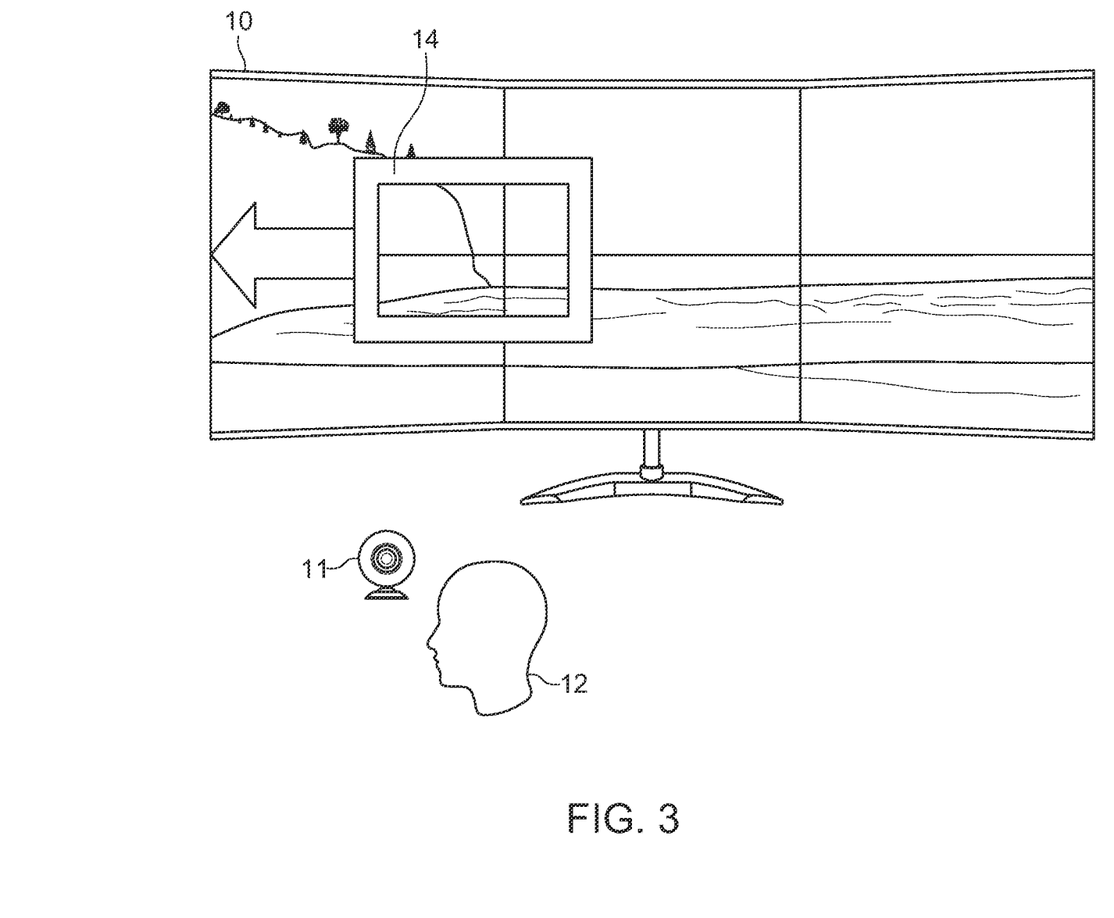
FIG. 3 shows a user's head turned to the left with the screen panning to the left, according to some embodiments.

FIG. 3 shows a user's head 12 turned to the left with the screen panning to the left, according to some embodiments. As shown, the portion 14 of the larger picture that is shown on a screen results in panning the screen to the left as indicated by the arrow pointing to the left. If the user turns their head 12 to the left, what is shown on the screen then pans to the left based on the webcam 11 and processing.

Figure 4:
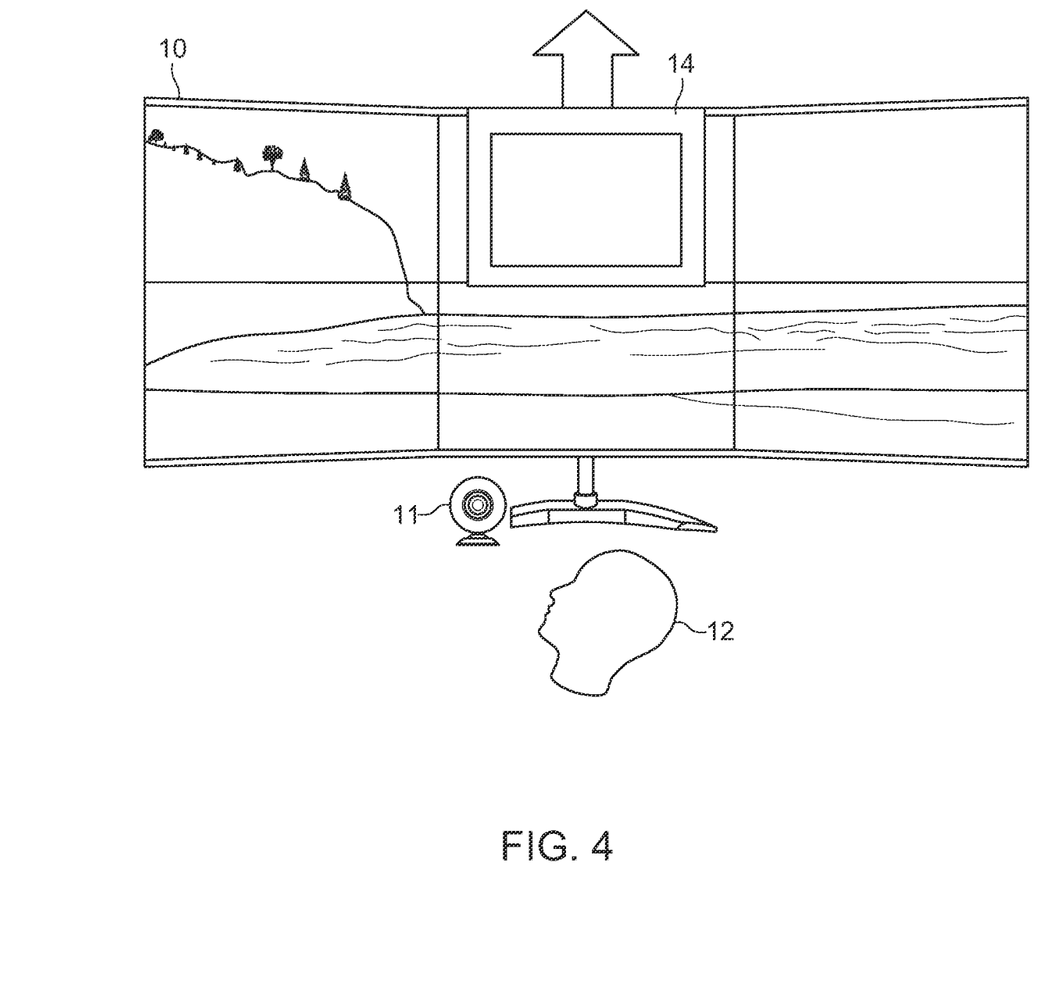
FIG. 4 shows a user's head turned upward with the screen panning upward, according to some embodiments.

FIG. 4 shows a user's head 12 turned upward with the screen panning upward, according to some embodiments. As shown, the portion 14 of the larger picture that is shown on a screen results in panning the screen upward as indicated by the arrow pointing to the top of the upper portion of the large panoramic virtual field image 10. If the user tilts their head 12 up, what is shown on the screen then pans upward based on the webcam 11 and processing.

Figure 5:
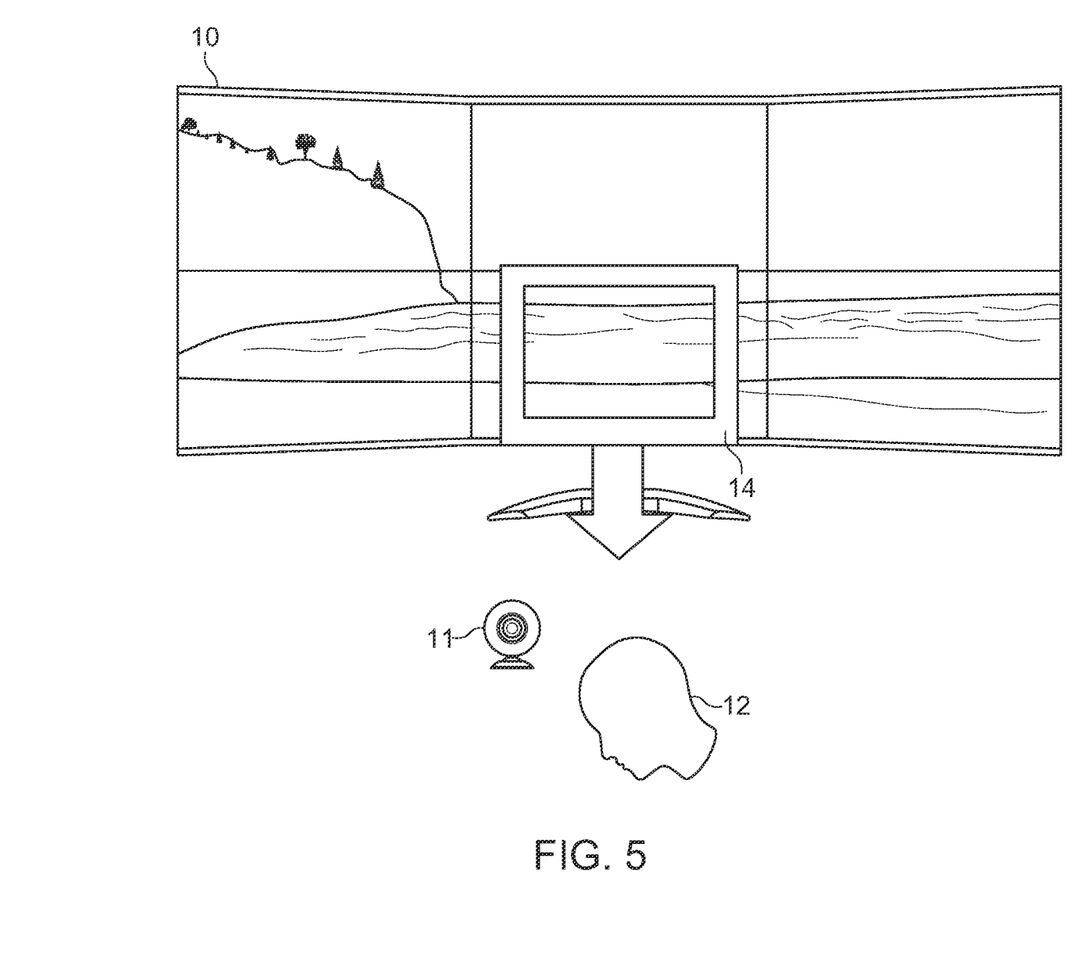
FIG. 5 shows a user's head turned downward with the screen panning downward, according to some embodiments.

FIG. 5 shows a user's head 12 turned downward with the screen panning downward, according to some embodiments. As shown, the portion 14 of the larger picture that is shown on a screen results in panning the screen downward as indicated by the arrow pointing to the bottom of the upper portion of the large panoramic virtual field image 10. If the user tilts their head 12 down, what is shown on the screen then pans downward based on the webcam 11 and processing.

In one or more embodiments, all directions (diagonal, curved, etc.) are tracked and reflected. In some embodiments, the system may lock to only horizontal and/or vertical movement, e.g., when working on spreadsheets, etc.

Figure 6:
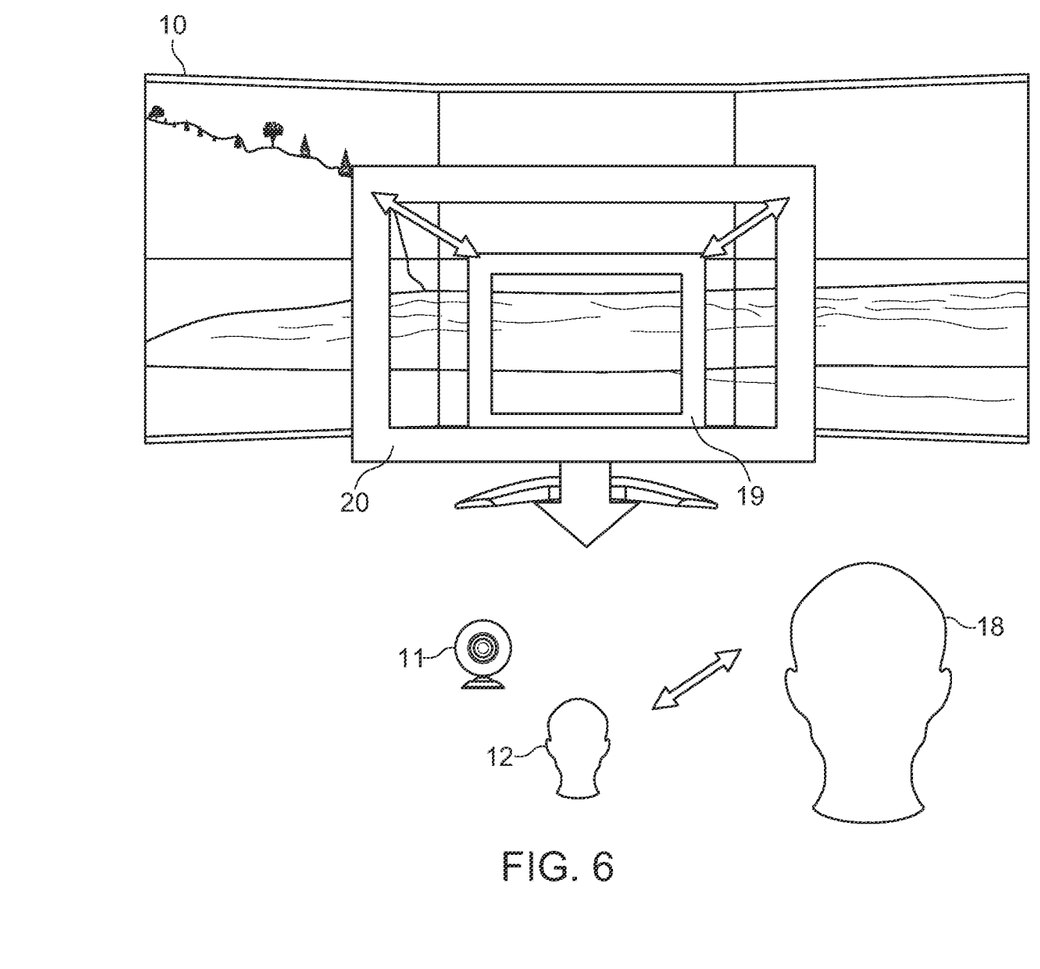
FIG. 6 shows a user's head moving toward the screen or away with the screen zooming in or zooming out, according to some embodiments.

FIG. 6 shows a user's head 12 moving toward the screen or away with the screen zooming in or zooming out, according to some embodiments. As shown, the portion 19 of the larger picture that is shown on a screen results in zooming in on the screen as indicated by the arrows pointing to the smaller rectangle 19 of the large panoramic virtual field image 10. If the user moves their head 12 in (as represented with the larger head 18) towards the screen, what is shown on the screen then zooms in based on the webcam 11 and processing. If the user moves their head 12 out (as represented with the smaller head 12) away from the screen, what is shown on the screen then zooms out based on the webcam 11 and processing.

Figure 7:
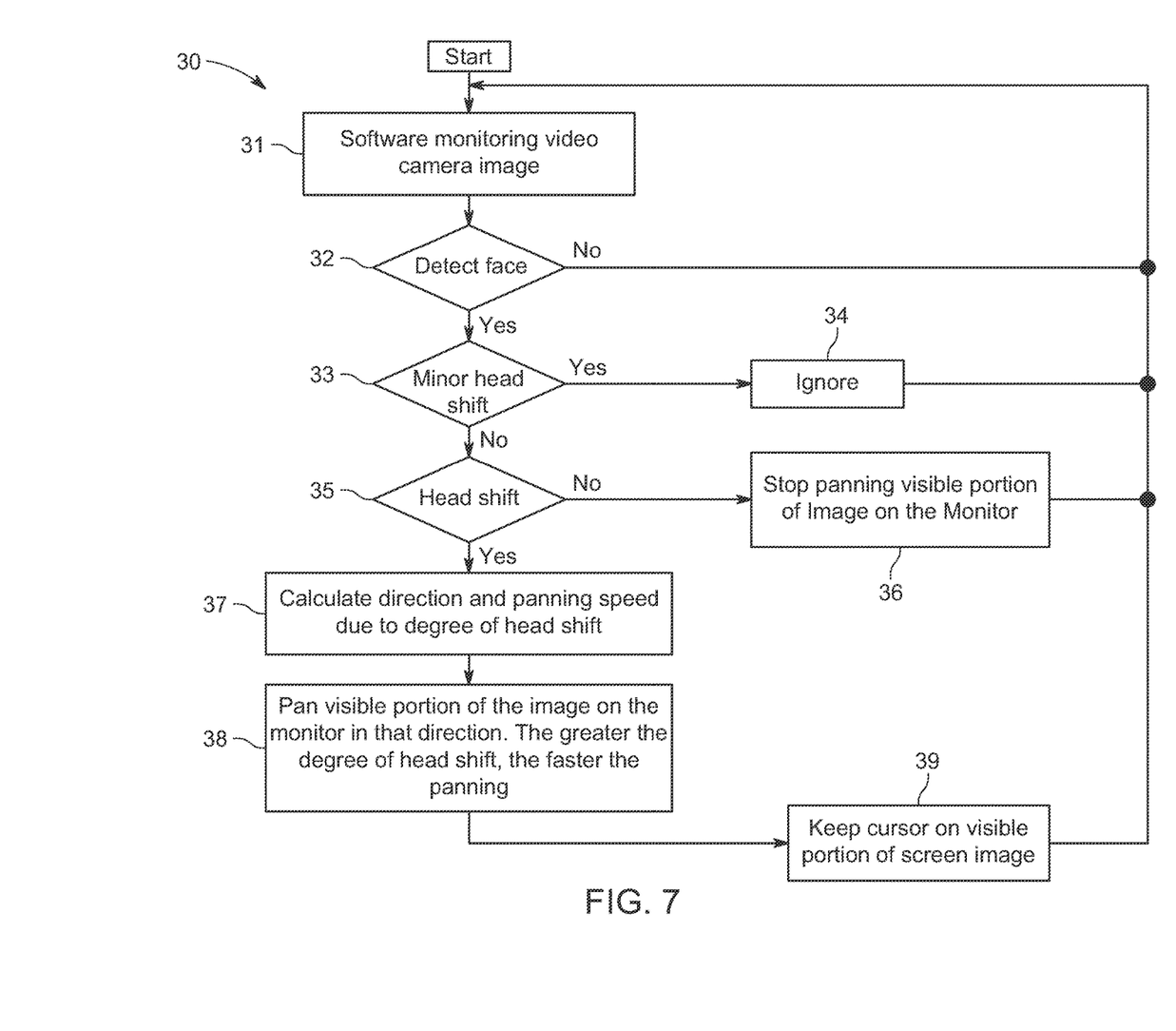
FIG. 7 shows a flow diagram for face position used for automatic panning, according to some embodiments.

FIG. 7 shows a flow diagram 30 for a method/process using face position for automatic panning, according to some embodiments. In one or more embodiments, in block 31 process 30 utilizes a software process for monitoring a video camera image. A user launches a "screen pan" process or software application, which uses a webcam to track face position. In some embodiments, this capability may become a standard feature incorporated into, for example, laptops (e.g., automatically launched at start up). In block 32, process 30 determines whether the face of the user is detected or not. If process 30 detects the user's face, process 30 continues to block 33, otherwise process 30 proceeds back to block 31. In one or more embodiments, as with multiple monitor solutions, a program client window may be used to arrange other program windows in the virtual "screen". Once completed, a much larger view field than the viewing area of the monitor or screen is available for use. In block 33, process 30 determines whether the user had a minor or insignificant (e.g., below a particular threshold of movement, such as five degrees, etc.) head shift (from facing forward) or not. For example, the user tilts their face up, down, and side-to-side to pan the virtual "screen" in those directions. If block 33 determines that the head shift was minor then process 30 proceeds to block 34 where the process optionally ignores the minor head shift and process 30 then proceeds back to block 31. If block 33 determines that there was not a minor head shift, process 30 proceeds to block 35. In block 35, process 30 determines whether there is a head shift or not. More significant deviations in facial position from straight forward (more significant tilt) yield faster panning speeds. In some embodiments, an option is to set the sensitivity of tracking to the head movement speed, such as the same as a mouse, etc. In one or more embodiments, process 30 may also learn from a user's typical actions. In some embodiments, process 30 is initially trained with the data from a set of training users. Thereafter, an individual user may let process 30 learn further from their specific actions. Process 30 learns by taking into account the following data points: 1) user's head/face movement, 2) resulting panning action, and 3) rating for the action (good or bad). If block 35 determines there is a head shift, process 30 proceeds to block 37. Otherwise, process 30 proceeds to block 36 where process 30 stops panning visible portion of the image on the monitor/screen, and then process 30 proceeds back to block 31. In one or more embodiments, process 30 may optionally move a cursor with panning or not move the cursor with panning. In block 37, process 30 calculates a direction and panning speed due to the degree of a head shift movement/motion. In block 38, process 30 pans a visible portion of the image on the monitor in that direction where the greater the degree of a head shift, the faster the panning. In one or more embodiments, process 30 may optionally proceed to block 39 where the cursor is kept on a visible portion of the screen image. Once either block 38 or optionally block 39 completes, process 30 returns to block 31.

In some embodiments, there are options for locking the view screen (e.g., freeze the view on the screen). In one or more embodiments, the screen always pans depending on the detected head movements of the user. The user then presses a button, key, button/key combination, gives verbal feedback, a gesture, etc., to freeze the view. In some embodiments, process 30 may also learn from a user's typical actions. For example, a user may press a button, a key, or a button/key combination, gives verbal feedback, etc., to initialize the head movement panning, and then releases the button, key, button/key combination, gives different verbal feedback, etc., to freeze the view.

In one or more embodiments, process 30 prevents overaction to spurious head movements. In some embodiments, process 30 includes options to initiate the starting and/or stopping of the panning of the screen. Process 30 may "learn" the user's typical movements and start auto-filtering, e.g., subtle head movements, etc.

In some embodiments, benefits of process 30 may include the feature that it is fully software based—with no additional hardware or devices needed for the movement tracking or the enlarged "screen". The larger "screen" is a virtual screen, not mechanical. In one or more embodiments, process 30 works with any existing monitor (e.g., non-portable screen, etc.) or portable device (e.g., laptop, tablet, etc.) screen of any size, and does not require additional physical workspace. In one or more embodiments, process 30 uses the facial position of the user as the direction input method, which frees the user's hands and/or voice for other tasks.

Figure 8:
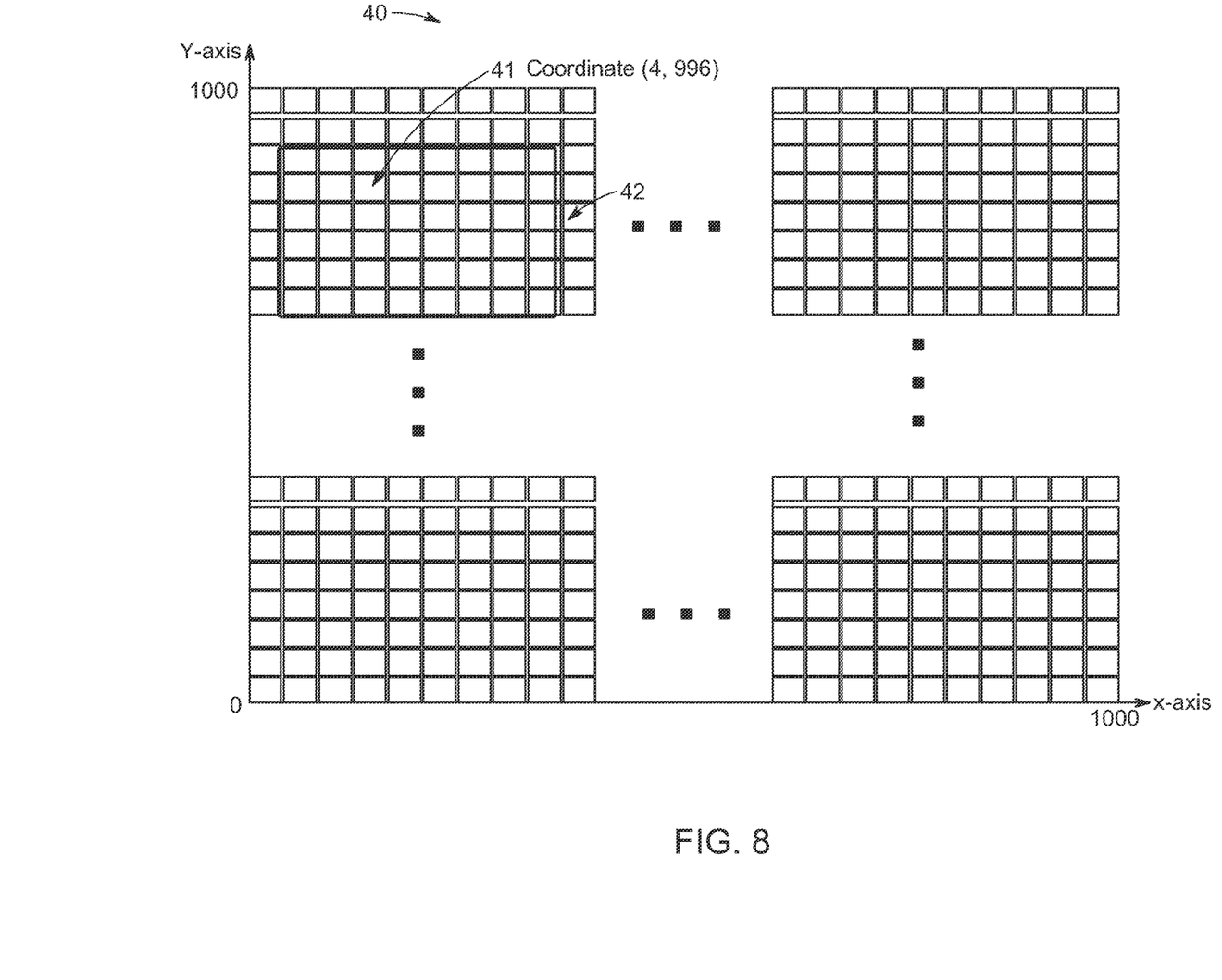
FIG. 8 shows a full virtual screen grid used with machine learning (ML), according to some embodiments.

FIG. 8 shows a full virtual screen grid 40 used with machine learning (ML), according to some embodiments. The virtual screen is divided into equally sized square display segments with the X-axis from 0 to 1000, and the Y-axis from 0 to 1000. The section of the full virtual screen 42 displayed is determined by four x and y coordinate values (physical screen display flag). An example coordinate 41 has x=4 and y=996. In some embodiments, an acceleration flag is used in conjunction with the user's head position to determine panning speed (faster or slower) to pan across the virtual display field (e.g., with an acceleration flag, etc.). The user moves their head up, down, right, or left to initiate the panning in that particular direction. In one or more embodiments, the user's head tilt must be detected for a minimum time (e.g., 3 seconds, etc.) to filter spurious head movements (e.g., using a spurious time flag, etc.). Default flag values are automatically modified when a user quickly returns to display a section of the virtual field substantially near the section of the virtual field section displayed just before the most recent panning (e.g., within 3 seconds, etc.). This indicates that the user did not want to pan. In one or more embodiments, default flags are modified if a similar head movement pattern is detected over a threshold flag value (e.g., four times in same day, etc.).

In some embodiments, the system may unlearn a pattern if the reverse happens over the threshold. The ML process detects and saves more complicated motion patterns (e.g., user sipping coffee, etc.) by saving the path and duration of the motion (e.g., head pivots right 2-4 display segments when a cup is picked up, and then up 3-5 display segments for 2 to 4 seconds taking a sip, and then down a similar number of segments). In one or more embodiments, the user may also hit a key sequence (e.g., CNTR-B, etc.) to have the software pan back to the section of the virtual field displayed before the most recent panning. These requests are also used to adjust defaults when associated with a specific motion pattern that exceeds some threshold. In some embodiments, the user may manually adjust the panning speed by hitting a key sequence (e.g., CNTR-A, etc.), which pops up a window for them to make the adjustment faster or slower (e.g., with a bar they can click on and slide to faster or slower, etc.). In one or more embodiments, the user may revert back to factory defaults by hitting a specific key sequence (e.g. CNTR-D, etc.). In some embodiments, each system may send their modified default setting back to a central location (e.g., cloud-based server, server, etc.) for providing better defaults in the future.

Computer users often find it advantageous to configure their personal computer system with multiple video monitors to provide a wider field of view or enable them to view multiple screens simultaneously. Multiple monitor configurations are appropriate when a user workstation is confined to a fixed location. It is impractical, however, for portable computing device users to transport additional monitors when moving around. Some conventional systems attempt to address the mobile multiple monitor issue via light weight screens that can be more easily transported, but this does not completely resolve the problem. In one or more embodiments, the system provides much of the benefit of multiple screen image viewing without the need for additional monitors. An automatic, easy-to-use, all-in-one solution for viewing a much larger screen image than what fits on a single screen is provided by one or more embodiments. Some embodiments do this without requiring multiple monitors or monitor screens. Smart software captures and analyzes the video webcam image to detect a face and determine facial orientation to automatically pan the screen image to the larger field of view. This provides users with physical and/or vocal limitations to become enabled for productivity.

In one or more embodiments, the ML model(s) or algorithms utilized employ one or more AI models or algorithms. AI models may include a trained ML model (e.g., models, such as an NN, a CNN, a recurrent NN (RNN), a Long short-term memory (LSTM) based NN, gate recurrent unit (GRU) based RNN, tree-based CNN, KNN, a self-attention network (e.g., a NN that utilizes the attention mechanism as the basic building block; self-attention networks have been shown to be effective for sequence modeling tasks, while having no recurrence or convolutions, BiLSTM (bi-directional LSTM), etc.). An artificial NN is an interconnected group of nodes or neurons.

Figure 9:
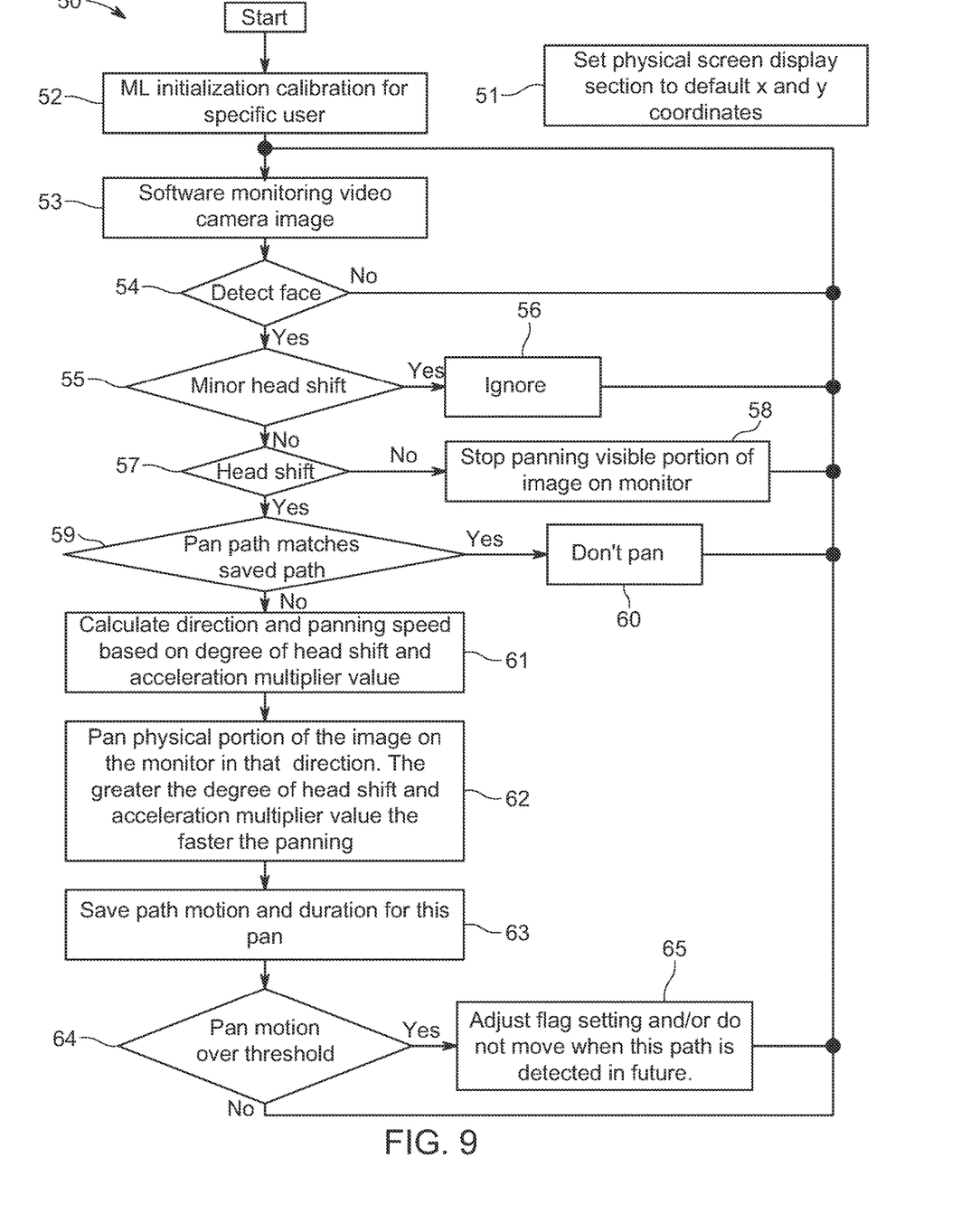
FIG. 9 shows another flow diagram for a method/process using face position for automatic panning that utilizes ML, according to some embodiments.

FIG. 9 shows another flow diagram 50 for a method/process using face position for automatic panning that utilizes ML, according to some embodiments. In one or more embodiments, in block 51, process 50 sets the physical screen display section to default x and y coordinates. In block 52, process 50 initializes ML process calibration for a specific user. In one or more embodiments, in block 53, process 50 utilizes a software process for monitoring a video camera image. A user launches a "screen pan" process or software application, which uses a webcam to track face position. In some embodiments, this capability may become a standard feature incorporated into, for example, laptops (e.g., automatically launched at start up). In block 54, process 50 determines whether the face of the user is detected or not. If process 50 detects the user's face, process 50 continues to block 55 otherwise process 50 proceeds back to block 53. In one or more embodiments, as with multiple monitor solutions a program client window may be used to arrange other program windows in the virtual "screen." Once completed, a much larger view field than the physical viewing area of the monitor or portable device screen is available for use. In block 55, process 50 determines whether the user had a minor or insignificant (e.g., below a particular threshold of movement, such as five degrees, etc.) head shift (from facing forward) or not. For example, the user tilts their face up, down, and side-to-side to pan the virtual "screen" in those directions. If block 55 determines that the head shift was minor, then process 50 proceeds to block 56 where the process optionally ignores the minor head shift and process 50 then proceeds back to block 53. If block 55 determines that there was not a minor head shift, process 50 proceeds to block 57. In block 57, process 50 determines whether there is a more significant head shift or not (e.g., above a particular threshold, such as five degrees, etc., not a head shake motion, head bobbing motion (e.g., if listening to music, etc.), head motion from breathing, yawning, etc.). More significant deviations in facial position from straight forward (more significant tilt) yield faster panning speeds. In some embodiments, an option is to set the sensitivity of tracking to the head movement speed, such as the same as a mouse, etc. In one or more embodiments, process 50 may also learn from a user's typical actions. In some embodiments, process 50 is initially trained with the data from a set of sponsor users. Thereafter, an individual user may let process 50 learn further from their specific actions.

In some embodiments, process 50 learns by taking into account the following data points: 1) user's movement, 2) resulting panning action, and 3) rating for the action (good or bad). If block 57 determines there is a head shift, process 50 proceeds to block 59. Otherwise, process 50 proceeds to block 58 where process 50 stops panning a visible portion of the image on the monitor/screen, and then process 50 proceeds back to block 53. In one or more embodiments, process 50 may optionally move a cursor with panning or not move the cursor with panning. In block 59, process 50 determines whether the pan path matches a saved path or not. If the pan path does not match a saved pan path, process 50 proceeds to block 61, otherwise process 50 proceeds to block 60 where process 50 does not pan using the webcam 11 (FIGS. 1-6). In block 61, process 50 calculates a direction and panning speed based on the degree of the head shift movement/motion (e.g., in relation to one or more thresholds of movement in degrees, distance (e.g., inches, etc.), etc.) and acceleration multiplier value. In block 62, process 50 pans a physical portion of the image on the monitor in that direction where the greater the degree of a head shift and the acceleration multiplier value, the faster the panning. In block 63, process 50 saves the path motion and duration for the pan. In block 64, process 50 determines whether the pan motion is over/greater than a threshold. If the pan motion is over/greater than the threshold, process 50 proceeds to block 65. Otherwise, process 50 proceeds back to block 53. In block 65, process 50 adjusts a flag setting (or other similar setting, such as a bit, a variable, etc.) and/or does not move/pan when the path is detected in the future (i.e., process 50 learns panning paths).

Figure 10:
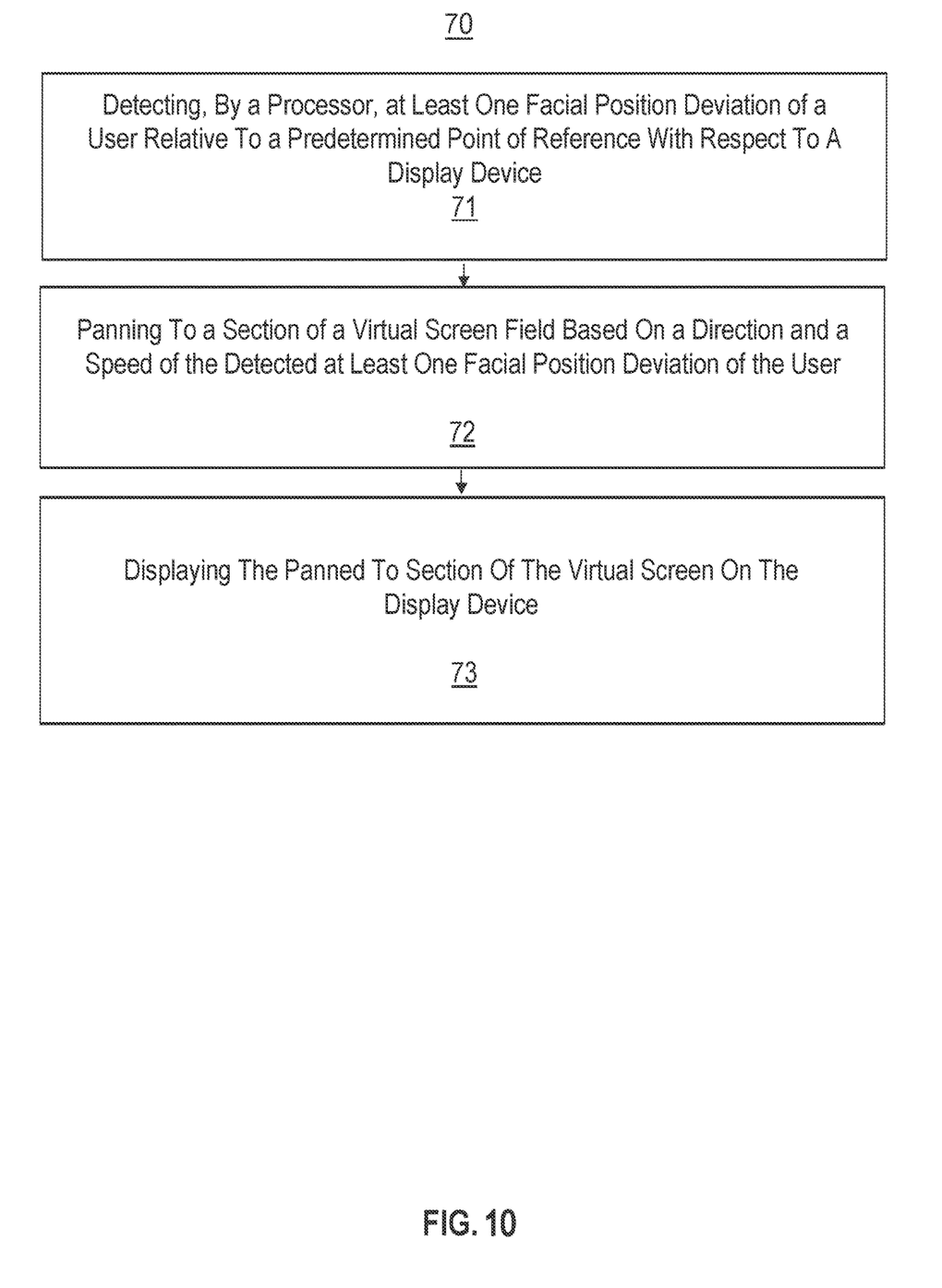
FIG. 10 illustrates a process for using face position for automatic panning, according to some embodiments.

FIG. 10 illustrates a process 70 for using face position for automatic panning, according to some embodiments. In one embodiment, in block 71 process 70 provides detecting, by a processor, at least one facial position deviation of a user relative to a predetermined point of reference with respect to a display device. The at least one facial position deviation includes head movement of the user (using device architecture shown in FIGS. 1-6), or the flow diagrams from FIG. 7 or 9). In block 72, process 70 provides panning to a section of a virtual screen field based on a direction and a speed of the detected at least one facial position deviation of the user. In block 73, process 70 provides displaying the panned to section of the virtual screen on the display device. Therefore, process 70 provides for utilizing a software mechanism in conjunction with a webcam to track the head movements of a computer user and, based on those movements, automatically adjusts the portion of a large virtual field image displayed on the screen.

In some embodiments, process 70 may include the feature of filtering out spurious facial position deviations of the user relative to the predetermined point of reference with respect to the one or more display devices.

In one or more embodiments, process 70 may further include the feature that extemporaneous user facial position movements are filtered out for prevention of unintentional panning.

In some embodiments, process 70 may include the feature where panning utilizes a video camera from a portable computing device.

In one or more embodiments, process 70 may additionally include the feature that panning direction and speed of panning are each determined based on eye motion of the user.

In some embodiments, process 70 may further include the feature that panning direction and speed of panning are each determined based on hand motion of the user.

In one or more embodiments, process 70 may include the feature that the detecting utilizes machine learning for learning a movement pattern that is ignored for future detecting.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
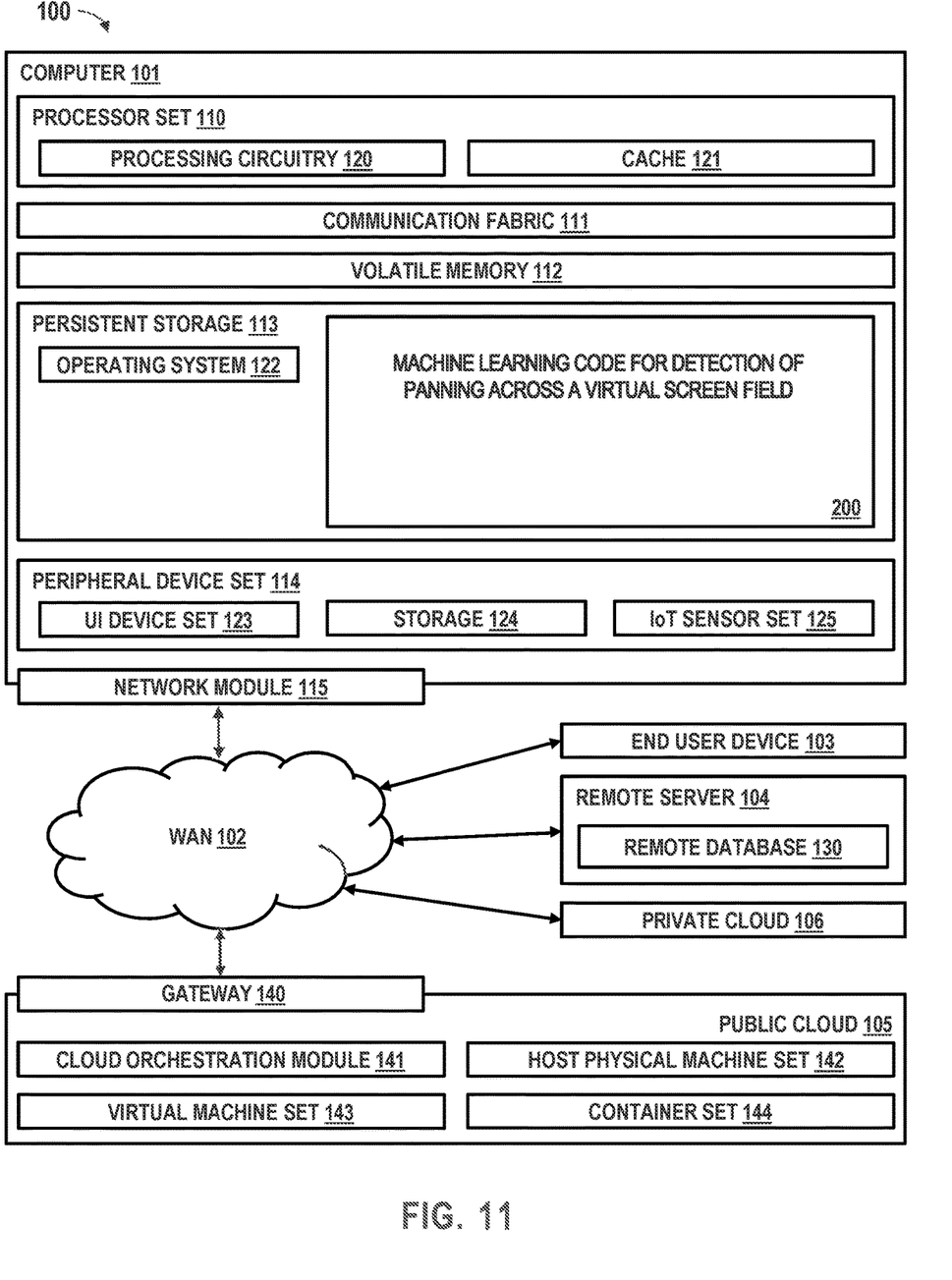
FIG. 11 illustrates an example computing environment utilized by some embodiments.

FIG. 11 illustrates an example computing environment 100 utilized by one or more embodiments. Computing environment 100 contains an example of an environment for the execution of at least some of the computer code 200 involved in performing the inventive methods (such as ML (model) code for detection of panning across a virtual screen field, code for detection of head (or hand or eye) motion, etc.). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method comprising:
   detecting, by a processor, at least one facial position deviation of a user relative to a predetermined point of reference with respect to a display device, wherein the at least one facial position deviation includes head movement of the user;
   filtering out spurious facial position deviations of the user relative to the predetermined point of reference with respect to the display device;
   panning to a section of a virtual screen field based on a direction and a speed of the at least one facial position deviation of the user; and
   displaying the section of the virtual screen field on the display device.

2. The method of claim 1, wherein extemporaneous user facial position movements are filtered out for prevention of unintentional panning.

3. The method of claim 1, wherein the panning is initiated by a software process that utilizes processed images from a video camera of a portable computing device.

4. The method of claim 1, wherein the direction and the speed of the at least one facial position deviation of the user are each determined based on eye motion of the user.

5. The method of claim 1, wherein the direction and the speed of the at least one facial position deviation of the user are each determined based on hand motion of the user.

6. The method of claim 1, wherein the detecting utilized machine learning for learning a movement pattern that is ignored for future detecting.

7. A computer program product comprising:
one or more non-transitory computer readable storage mediums; and
program instructions stored on the one or more non-transitory computer readable storage mediums to perform operations comprising:
detecting at least one facial position deviation of a user relative to a predetermined point of reference with respect to a display device, wherein the at least one facial position deviation includes head movement of the user;
filtering out spurious facial position deviations of the user relative to the predetermined point of reference with respect to the display device;
panning to a section of a virtual screen field based on a direction and a speed of the at least one facial position deviation of the user; and
displaying the section of the virtual screen field on the display device.

8. The computer program product of claim 7, wherein extemporaneous user facial position movements are filtered out for prevention of unintentional panning.

9. The computer program product of claim 7, wherein the panning is initiated by a software process that utilizes processed images from a video camera of a portable computing device.

10. The computer program product of claim 7, wherein the direction and the speed of the at least one facial position deviation of the user are each determined based on eye motion of the user.

11. The computer program product of claim 7, wherein the direction and the speed of the at least one facial position deviation of the user are each determined based on hand motion of the user.

12. The computer program product of claim 7, wherein the detecting utilizes machine learning a movement pattern that is ignored for future detecting.

* * * * *